United States Patent
Idensjo

(10) Patent No.: US 8,381,679 B2
(45) Date of Patent: Feb. 26, 2013

(54) METHOD IN A MILKING SYSTEM FOR CREATING A REQUIRED VACUUM LEVEL AND COMPUTER PROGRAM PRODUCTS

(75) Inventor: Henrik Idensjo, Huddinge (SE)

(73) Assignee: DeLaval Holding AB, Tumba (SE)

( * ) Notice: Subject to any disclaimer, the term of this patent is extended or adjusted under 35 U.S.C. 154(b) by 405 days.

(21) Appl. No.: 12/450,069

(22) PCT Filed: Apr. 2, 2008

(86) PCT No.: PCT/SE2008/000242
§ 371 (c)(1),
(2), (4) Date: Sep. 29, 2009

(87) PCT Pub. No.: WO2008/121051
PCT Pub. Date: Oct. 9, 2008

(65) Prior Publication Data
US 2010/0018465 A1    Jan. 28, 2010

(30) Foreign Application Priority Data
Apr. 3, 2007    (SE) ...................................... 0700828

(51) Int. Cl.
*A01J 5/00*    (2006.01)
(52) U.S. Cl. .................. 119/14.02; 119/14.43
(58) Field of Classification Search ............... 119/14.02, 119/14.08, 14.14, 14.29, 14.3, 14.43; *A01J 5/00*
See application file for complete search history.

(56) References Cited

U.S. PATENT DOCUMENTS

| | | | |
|---|---|---|---|
| 5,704,311 A * | 1/1998 | van den Berg | 119/14.02 |
| 5,797,729 A | 8/1998 | Rafuse, Jr. et al. | |
| 5,845,509 A | 12/1998 | Shaw et al. | |
| 6,185,946 B1 | 2/2001 | Hartman | |
| 6,370,888 B1 | 4/2002 | Grabon | |
| 6,921,379 B2 | 7/2005 | Greter et al. | |
| 7,909,055 B2 * | 3/2011 | Mostert | 137/494 |
| 2003/0019431 A1 * | 1/2003 | van den Berg et al. | 119/14.02 |
| 2003/0061993 A1 * | 4/2003 | Vijverberg et al. | 119/14.14 |
| 2004/0182325 A1 * | 9/2004 | Sjolund et al. | 119/14.02 |

(Continued)

FOREIGN PATENT DOCUMENTS

| | | |
|---|---|---|
| BY | 4708 C1 | 9/2002 |
| EP | 1344941 | 9/2003 |

(Continued)

OTHER PUBLICATIONS

Third Party Observations dated Oct. 8, 2008 submitted in corresponding European Application No. 08724160.0.

(Continued)

*Primary Examiner* — Son T Nguyen
*Assistant Examiner* — Shadi Baniani
(74) *Attorney, Agent, or Firm* — Young & Thompson

(57) ABSTRACT

The invention relates to a method in a milking system for creating a required vacuum level, the milking system comprising at least two variable speed vacuum pumps P1, P2. The method comprises the steps of: utilizing a first variable speed vacuum pump P1 for creating the required vacuum level within the milking system; monitoring the vacuum level requirement within the milking system, and when the vacuum level requirement of the milking system is such that the speed of the first variable speed vacuum pump P1 reaches a first speed threshold then: starting a second variable speed vacuum pump P2, and running the first and second variable speed vacuum pumps P1, P2 in parallel for creating the required vacuum level. The invention also relates to computer program products.

18 Claims, 2 Drawing Sheets

U.S. PATENT DOCUMENTS

| | | | |
|---|---|---|---|
| 2005/0056224 A1* | 3/2005 | Van Den Berg et al. | 119/14.02 |
| 2005/0115256 A1 | 6/2005 | Okano | |
| 2005/0120965 A1* | 6/2005 | Van Den Berg et al. | 119/14.02 |
| 2005/0188708 A1 | 9/2005 | Wills et al. | |
| 2005/0223724 A1 | 10/2005 | Crane et al. | |
| 2008/0041315 A1* | 2/2008 | Stellnert et al. | 119/14.02 |
| 2009/0084318 A1* | 4/2009 | Bosma | 119/14.02 |
| 2010/0154715 A1* | 6/2010 | Persson et al. | 119/14.08 |
| 2011/0132264 A1* | 6/2011 | Akerman | 119/14.08 |

FOREIGN PATENT DOCUMENTS

| | | |
|---|---|---|
| EP | 1906024 | 4/2008 |
| JP | 2004524016 A | 8/2004 |
| SU | 1606054 A1 | 3/1990 |
| SU | 1558349 A1 | 4/1990 |
| SU | 1607749 A1 | 11/1990 |
| WO | WO 02/03780 | 1/2002 |
| WO | WO 2006/006906 | 1/2006 |
| WO | WO 2006/051260 | 5/2006 |

OTHER PUBLICATIONS

Translation of Japanese Office Action, dated Mar. 13, 2012, from corresponding Japanese application No. 2010-502056.

Decision on Grant, dated Apr. 5, 2012, from corresponding Russian application No. 2009140398.

* cited by examiner

METHOD IN A MILKING SYSTEM FOR CREATING A REQUIRED VACUUM LEVEL AND COMPUTER PROGRAM PRODUCTS

FIELD OF THE INVENTION

The present invention relates generally to the field of vacuum regulation in connection with machine milking. In particular, the invention relates to a method in a milking system for creating a required vacuum level. The invention also relates to computer program products for implementing the method.

BACKGROUND OF THE INVENTION

Today, large parts of milking related operations have been automated and many farmers utilize automated milking system for milking their milking animals. A prerequisite for implementing such automation is a vacuum regulation system for creating and regulating vacuum within the milking system.

Generally, there are different issues to take into consideration when designing a vacuum regulation system for a milking system. An excessive vacuum level may injure the animals being milked, while on the other hand a too low vacuum level may slow down the milking related operations. Further, it is desirable to keep the vacuum level of a milking system at a constant level during certain operations, without unnecessary fluctuations of the vacuum level.

It is desirable to keep the energy consumption at a lowest level possible in the milking system. The vacuum regulation system of a typical dairy farm consumes a large part of the total amount of electricity used and the vacuum regulation system should thus be made as efficient as possible.

The vacuum regulation system typically comprises a vacuum pump, which is chosen so as to be able to remove air from within the milking system to meet a required maximum vacuum level and air demand within the milking system. If a single vacuum pump is not enough to meet the requirements, then two or more vacuum pumps may be installed. The vacuum pumps may be arranged to provide vacuum in different parts of the milking system. The vacuum regulation system further typically comprises a control device to regulate the speed of the vacuum pumps, and thereby the amount of air being removed from the milking system and/or to regulate valves for keeping the vacuum level at a desired level.

An example of a vacuum regulation system comprising variable speed vacuum pumps is disclosed in the International patent publication WO 2006/006906, assigned to the same applicant as the present application. If the vacuum requirement within the milking system is such that the capacity of a first vacuum pump is not enough, then the speed of the first vacuum pump is set to a fixed speed, while a second vacuum pump is started. The vacuum level in the milking system is then controlled by means of the speed of the second vacuum pump.

There are difficulties involved when controlling two or more vacuum pumps simultaneously. For example, it may be difficult to keep the vacuum level at a constant level. This is especially the case when the amount of air required to be removed from the milking system is rather low and the vacuum pumps are therefore run at a low speed. There is also a danger of overheating the vacuum pumps.

In view of the above it would be desirable to provide an improved method for controlling a vacuum level within a milking system.

SUMMARY OF THE INVENTION

It is a general object of the invention to provide a method for creating and regulating a required vacuum level within a milking system.

It is another object of the invention to provide a method for creating and regulating the vacuum level providing a constant vacuum level within the milking system, without vacuum fluctuations that may cause discomfort for the milking animals.

It is yet another object of the invention to provide a method for creating and regulating the vacuum level, wherein the energy consumption for creating the required vacuum level in the milking system can be kept at a minimum.

It is still another object of the invention to provide a flexible method for creating and regulating the vacuum level, for example flexible in regards of the number of vacuum pumps and ease of maintaining and servicing the vacuum pumps.

These objects, among others, are achieved by a method for creating a required vacuum level within the milking system and by computer program products, as claimed in the independent claims.

In accordance with the invention, a method is provided for creating a required vacuum level within a milking system comprising at least two variable speed vacuum pumps. The method comprises the steps: utilizing a first variable speed vacuum pump for creating the required vacuum level within the milking system; monitoring the vacuum level requirement within the milking system, and when the vacuum level requirement of the milking system is such that the speed of the first variable speed vacuum pump reaches a first speed threshold then: starting a second variable speed vacuum pump and running the first and second variable speed vacuum pumps in parallel for creating the required vacuum level. In the present application, to run two or more variable speed vacuum pumps in parallel means that they are all controlled based on the same control signal. The control unit provides the same control signal to all vacuum pumps. If the vacuum pumps are identical this would then in turn mean that they are run at substantially equal speed or rpm. In accordance with the invention, there is no need to over-dimension the capacity of one variable speed pump in order to be able to provide a required vacuum level when much air is admitted to the milking system. In accordance with the invention the number of variable speed vacuum pumps that is in fact needed for a particular milking operation is utilized. Further, it is easy to perform maintenance of the two or more vacuum pumps of a milking system, which utilizes the method in accordance with the invention. For example, any vacuum pump can be taken out of operation in order to be serviced without interrupting or essentially affecting ongoing milking operations.

In accordance with an embodiment of the invention, the method comprises the additional step of decreasing the speed of the second variable speed vacuum pump to zero when the vacuum requirement within the milking system is such that the speed of the first and/or second variable speed vacuum pumps falls below a speed threshold. By means of this feature, there is no need to run two or more variable speed vacuum pumps at their lower capacity limit. For instance, as soon as the vacuum requirement is such that a single vacuum pump is enough to meet the requirement, then the other(s) are turned off one by one until the vacuum pumps needed are run at a suitable capacity level. Alternatively, when e.g. a speed of 80% of the maximum speed for one vacuum pump suffices to meet the vacuum requirement, then the other(s) may be turned off and only one vacuum pump is run. This enables an energy saving, since it is more energy consuming to run several vacuum pumps at their lower capacity level than running a single vacuum pump at its upper capacity level. Further, the vacuum pumps are run at an as optimal as possible speed at all times, prolonging their service life.

Further embodiments are defined in the dependent claims.

In accordance with a further aspect of the invention computer program products are provided, whereby advantages similar to the above are achieved. In particular, the invention may thereby easily be implemented in already existing milking systems.

Further characteristics of the invention and advantages thereof will be evident from the detailed description of embodiments of the present invention given hereinafter and the accompanying figures, which are only given by way of illustration.

DETAILED DESCRIPTION OF EMBODIMENTS

The invention is in the following described for three variable speed vacuum pumps, but it is to be noted that the number of variable speed vacuum pumps can be extended to any number of variable speed vacuum pumps. However, as will be evident, there have to be at least two variable speed vacuum pumps for the method to be applicable. The number of variable speed vacuum pumps is primarily dependent on the size of the milking system, the vacuum level required and the amount of air that may enter (leak into) the milking system, for example during different milking operations.

Figure 1:
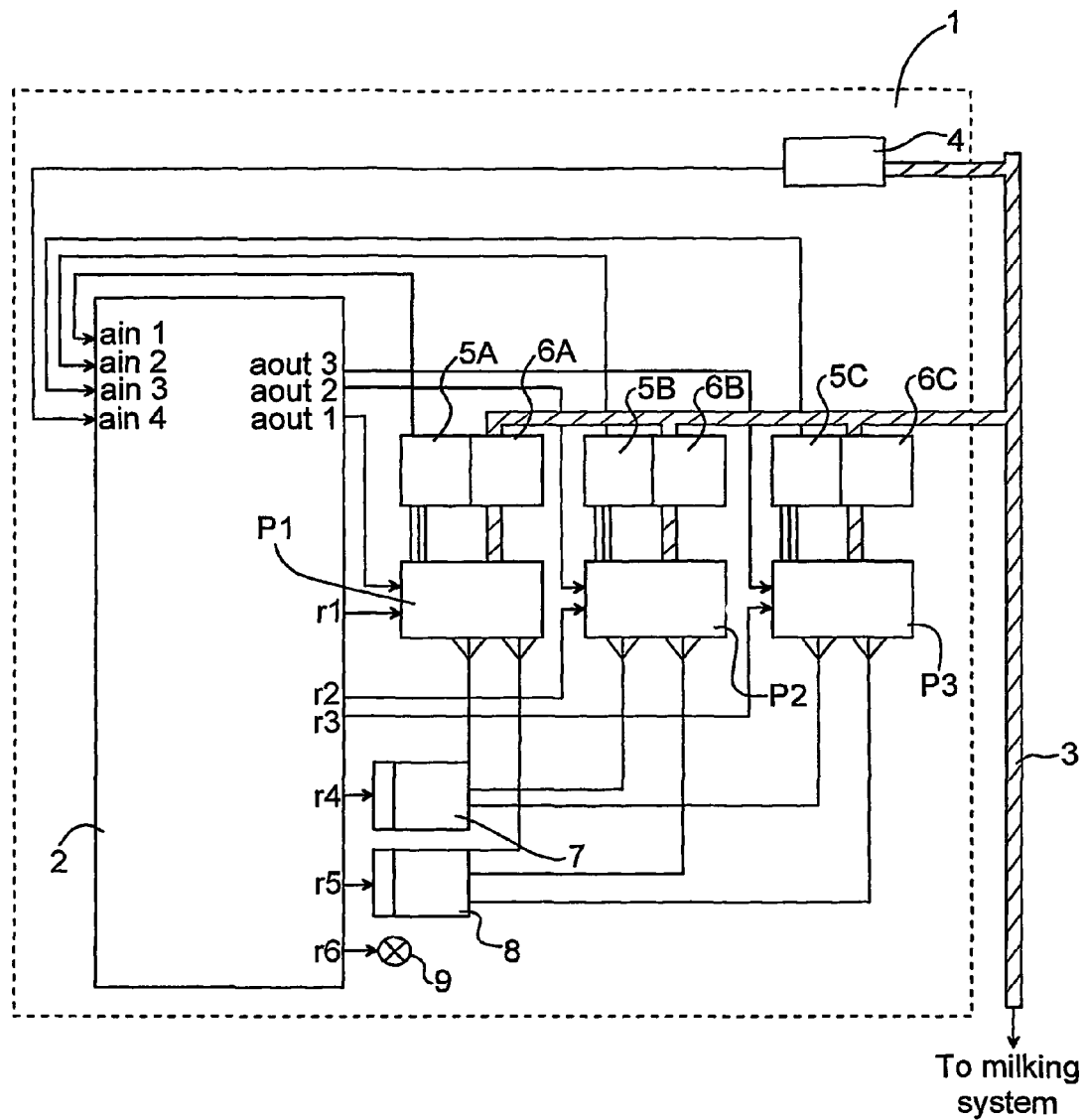
FIG. 1 is a block diagram over an exemplary implementation of the present invention.

The present invention will now be described, with reference first to FIG. 1. FIG. 1 illustrates schematically different parts of a vacuum regulation system 1 suitable for creating and regulating a vacuum level within a milking system. The vacuum regulation system 1 comprises three variable speed vacuum pumps P1, P2, P3, which can all be run at different speeds, that is, at different revolutions per minute (rpm). The respective speed of the variable speed vacuum pumps P1, P2, P3 is dependent on the vacuum requirement of and the amount of air entering the milking system. The vacuum regulation system 1 further comprises vacuum lines 3 connected to the variable speed vacuum pumps P1, P2, P3, to a vacuum sensor 4 and to different vacuum requiring parts of the milking system. (not shown).

A control unit 2 is arranged to control the vacuum regulation system 1. The control unit comprises a regulator part, for example a PI-regulator. The regulator provides a control signal to the variable speed vacuum pumps P1, P2, P3 in order to regulate their speed. The control unit 2 compares an input signal that indicates the actual vacuum level within the vacuum system with a desired value and the regulator regulates the speeds accordingly.

The control unit 2 comprises a number of inputs and a number of outputs. In the figure four analog signal inputs ain1, ain2, ain3, ain4, three analog signal outputs aout1, aout2, aout3 and six relay signal outputs r1, r2, r3, r4, r5, r6 are shown. It is noted that the number of inputs and outputs may be varied in accordance with need by simply adding or removing outputs and inputs.

Analog signal inputs ain1, ain2 and ain3 are connected to temperature sensors 5A, 5B and 5C. The temperature sensors 5A, 5B, 5C are optional and are arranged to measure the temperature of a respective variable speed vacuum pump P1, P2, P3. If the temperature of a certain variable speed vacuum pump exceeds a set threshold, the corresponding relay signal output may be used to deactivate the vacuum pump.

The fourth analog signal input ain4, in the following denoted vacuum control signal ain4, is connected to the vacuum sensor 4. The vacuum sensor 4 is arranged to measure the vacuum level within the milking system and to provide a vacuum control signal to the control unit 2 indicating this vacuum level. The vacuum control signal is input to the control unit 2 at input ain4.

The analog signal outputs aout1, aout2, aout3 are arranged to provide a signal to each respective variable speed vacuum pump P1, P2, P3 for regulating their respective speeds. The analog signal to be sent is dependent on the analog vacuum control signal obtained from the vacuum sensor 4. In particular, the speed of the variable speed vacuum pumps P1, P2, P3 is dependent on the vacuum requirement within the milking system (to be described more in detail later); if the vacuum sensor 4 indicates a too low level, the speed of the variable speed vacuum pumps P1, P2, P3 has to be increased and if the speed of the variable speed vacuum pumps P1, P2, P3 provides a vacuum level which is too high, then the speed of one or more of the variable speed vacuum pumps P1, P2, P3 needs to be decreased. The analog signal outputs aout1, aout2 and aout3 are input to each respective variable speed vacuum pump and may be a signal having a value within the range of, for example, 0-10 V, which signals are then interpreted as a specific speed command depending on its value.

Three of the relay signal outputs r1, r2, r3 are arranged to provide signals to a respective one of the variable speed vacuum pumps P1, P2, P3 for switching them on and off, respectively.

Relay signal output r4 is arranged to activate a cleaning process. It is noted that such cleaning process is not applicable for all kinds of vacuum pumps, but is mainly related to lobe vacuum pumps. A cleaning water valve 7 is controlled by the relay signal r4. The cleaning of the variable speed vacuum pumps is preferably initiated automatically after a suitable number of hours of operation, although the cleaning process could alternatively be initiated manually. If several vacuum pumps are used, they should all preferably get cleaned at the same time, as all pumps should have approximately the same running hours in accordance with a multi pump switching, described later.

All pumps will preferably run during the washing phase in order to warm up. Thereafter water will be injected before or during the beginning of a blowing period, i.e. a period during which air is let into the vacuum system and the vacuum pumps work harder. The vacuum pumps will then dry during the end of the blowing period. The time during which water will be injected can be an adjustable parameter, the parameter then being set in the control unit 2. The time during which water will be injected could for example be 0.1-0.5 litres during 10 seconds, however depending on the pump size.

Relay signal output r5 is arranged to activate a valve for initiating an automatic spraying process after cleaning. Such spraying process could for example comprise spraying anti-corrosive or lubricant spray after a cleaning cycle has been performed. A parameter could be set in the control unit 2 for setting the spray time, for example 0.1 seconds.

Each variable speed vacuum pump P1, P2, P3 has a respective check valve 6A, 6B, 6C connected to it. The check valves 6A, 6B, 6C are provided for example in order to prevent air leakages in case one of the variable speed vacuum pumps is removed, for instance due to a service, or for preventing the variable speed vacuum pumps from rotating when not engaged.

The control unit 2 may also comprise means for keeping track of the running time for each variable speed vacuum pump. In a function, in the following denoted multi pump switching, the change of the start order of the variable speed vacuum pumps is altered in dependence on their respective running times. For example, if the first variable speed vacuum pump P1 has been started first for X hours (e.g. 100 hours) of power on, then the starting order can be changed so that the second variable speed vacuum pump P2 is started first and the first variable speed vacuum pump P1 is started last. By this multi pump switching feature, the variable speed vacuum pumps are run approximately equally much. The multi-pump switching principle can be extended to any number of variable speed vacuum pumps.

There may also be an external warning light, indicated in the figure at reference numeral 9. If there is a malfunctioning in the operation requiring the attention of a user, then a flashing light may be advantageous as the user can see it easily. The control unit 2 may therefore comprise a relay for switching on such warning light when needed.

The control unit 2 may further comprise means for shutting off a variable speed vacuum pump for service, while the one or more other variable speed vacuum pump(s) is/are in operation. The control unit 2 may then comprise a menu by means of which a chosen variable speed vacuum pump is put into service mode.

Further, the control unit 2 preferably includes a display for providing relevant information to the user, for example current vacuum level, settings, error messages, vacuum pump characteristics such as maximum speed or run time, etc.

The specific electronic components for implementing different functions are not described above, as they will be obvious to a person skilled in the art. For example, a person skilled in the art will have knowledge on how to implement a relay for controlling the signal outputs and signal processing.

In the method in accordance with the invention, the first variable speed vacuum pump P1 is started and utilized for creating the desired vacuum level within the milking system. The vacuum level within the milking system is at all times monitored by the vacuum sensor 4.

When the first variable speed vacuum pump P1 reaches a certain speed, denoted first speed threshold $Th_1$, which for example may be 80% of its maximum speed, then a second variable speed vacuum pump P2 is started by the relay signal provided by relay signal output r2. The speed of the second variable speed vacuum pump P2 is ramped up at, for example, approximately 10-20 Hz per second. In a preferred embodiment, the speed of the second variable speed vacuum pump P2 is ramped up and the speed of the first variable speed vacuum pump P1 is decreased correspondingly. When the two variable speed vacuum pumps P1, P2 have the same speed, which speed is enough to meet the vacuum requirement, then the analog signals aout1 and aout2 will be the same for both variable speed vacuum pumps. The vacuum regulation system 1 will then work as having two parallel variable speed vacuum pumps running together. The first and second variable speed vacuum pumps P1 and P2 are run together, which means that both variable speed vacuum pumps receive the same analog signal. The signal from the vacuum sensor 4 (input at ain4) is utilized for controlling both variable speed vacuum pumps.

When the speed of the variable speed vacuum pumps P1 and P2 reaches a certain speed limit, second speed threshold $Th_2$, which again could for example be 80% of their maximum speed, then the third variable speed vacuum pump P3 is started, and the same procedure as when starting the second variable speed vacuum pump P2 is performed. The variable speed vacuum pump P3 is ramped up and variable speed vacuum pumps P1 and P2 are ramped down until all vacuum pumps have the same speed and are commonly controlled by the same control signal, provided by the control unit 2.

In a similar manner, when it is determined that the vacuum requirement within the milking system is such that it is not necessary to run all three or even two variable speed vacuum pumps in parallel, then they are shut off. The determination as to when the vacuum requirement is such that one variable speed vacuum pump can be shut off may for example be when the speed limit of the variable speed vacuum pumps goes below 20% of their maximum speed. In particular, assuming that all three variable speed vacuum pumps P1, P2, P3 are run in parallel, when their speed goes under a certain speed limit, for example 20% of the maximum speed, then the third variable speed vacuum pump P3 ramps down and stops. The speed of the first and second variable speed pumps P1 and P2 is then ramped up correspondingly. This procedure is repeated when the vacuum requirement is such that the first variable speed vacuum pump P1 is enough for providing the required vacuum.

The criteria used for determining when to stop a vacuum pump may be a set speed limit, for example a certain percentage of its maximum speed, as described above. The vacuum pump that is no longer needed may be stopped immediately or there may be a criteria such as when two vacuum pumps have run at 30% of their maximum capacity during 10 seconds, then one of them will be stopped. Other criteria for determining when to stop a vacuum pump may be used, e.g. when the pump speed of each vacuum pump has decreased to 30-50%. This also applies for the decision when to start an additional vacuum pump.

Additional variable speed pumps may be added in accordance with need. The procedure for starting and stopping an $n^{th}$ variable speed vacuum pump is made in analogy with the above described procedures.

In the above embodiment, the speeds of the different variable speed vacuum pumps P1, P2, P3 are assumed to be identical when they are all three required for meeting the vacuum requirement within the milking system; that is, when they are run in parallel. However, the vacuum control signal ain4 from the vacuum sensor 4, which control signal defines the vacuum requirement to the respective variable speed vacuum pumps P1, P2, P3, may be interpreted differently by the different variable speed vacuum pumps P1, P2, P3. For example, the vacuum control signal ain4 may be the above-described analog input signal having a value in the range of 0-10 V. However, variable speed vacuum pump P1 may interpret a signal of 5 V so as to set its speed to x revolutions per minute, while variable speed vacuum pump P2 interprets the same signal to set its speed to y revolutions per minute, where x≠y. Thus, although running in parallel based on the same vacuum regulation signal (ain4), their speeds need not necessarily be equal, but both variable speed vacuum pumps' speed is changed up or down depending on vacuum requirements.

The first speed threshold $Th_1$ may be set to a certain percentage of the maximum speed of the first variable speed vacuum pump, for example 80%, 90% or 95% of its maximum capacity. Likewise, the second speed threshold $Th_2$, which is the speed of the first and the second variable speed vacuum pumps when run together, may be set to a certain percentage of their maximum speed, for example 75-90%. It is noted that the thresholds may be equal or may differ. Further, it is to be noted that the speed limits above regarding when to start and shut off a variable speed vacuum pump are only exemplary. The speed limits may be altered in accordance with need, for example be within the range of 60-95%, or in the range 60-99% of their maximum speeds.

The speed of a variable speed vacuum pump can be translated into capacity of the variable speed vacuum pump.

The speed with which the variable speed vacuum pump is ramped up or ramped down, may for example be within the range of 5-40 Hz per second. The ramping up speed may differ from the ramping down speed; the ramping up may for example occur at steps of 20 Hz/s and the ramping down at steps of 14 Hz/s.

Each variable speed pump may comprise a frequency controller providing the frequency, for controlling the speed of the pump, from an input DC voltage. Thus, the pump comprises a frequency controlled motor. The frequency controller is suitably also adapted to provide the ramping up and down of the pump speeds. Alternatively, the vacuum pump controller 2 provides the ramping.

In a preferred embodiment, all vacuum pumps are identical in size and type. However, different types of vacuum pumps may also be controlled in the manner described above. Examples of vacuum pumps that can be used when implementing the present invention comprise displacement vacuum pump (DVP), such as lobe vacuum pump (LVP), vane pump or scroll pump, although other vacuum pumps may be used as well.

Figure 2:
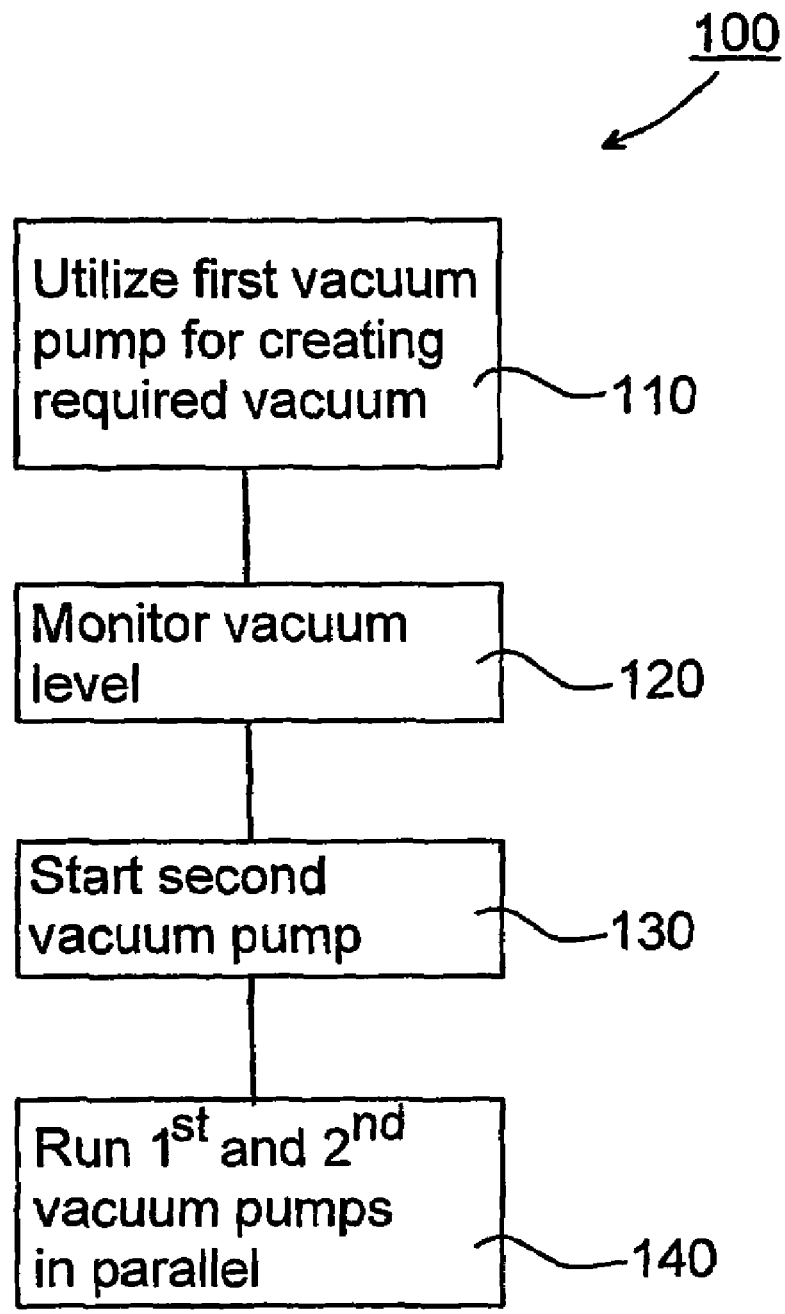
FIG. 2 is a flowchart over steps included in the method in accordance with the present invention.

FIG. 2 is a flow chart summarizing steps of the method in accordance with the invention. The method 100 comprises the first step, step 110, of utilizing a first variable speed vacuum pump P1 for creating the required vacuum level within the milking system. In a second step, step 120, the vacuum level within the milking system is monitored, e.g. by means of the vacuum sensor 4 together with the control unit 2. When the vacuum level of the milking system is such that the speed of the first variable speed vacuum pump P1 reaches the first speed threshold then a third and a fourth step of the method are initiated, step 130 and step 140. In step 130 the second variable speed vacuum pump P2 is started. In step 140 the first and the second variable speed vacuum pumps P1 and P2 are run in parallel for creating the required vacuum level within the milking system.

The invention is also related to a computer program product that is loadable into an internal memory of a computer that is used for controlling the vacuum pumps of the vacuum regulation system. The computer program product comprises software code portions for carrying out the method described above, when the computer program product is run on the computer. The invention is thus easily implemented in already existing milking systems having at least two variable speed vacuum pumps.

The computer program product may alternatively be stored on a computer readable storage medium, for example a compact disc. The computer readable storage medium comprises computer readable program code means for causing the computer of the milking station to carry out the method described above.

In the description the term "vacuum requirement" is used. It is noted that a vacuum requirement (vacuum demand) within the milking system is influenced by the amount of air entering the milking system and air leaking from the milking system. The amount of air being let out/let into the milking system is different during different points of time, for example depending on type of milking operation being performed. Therefore, in order to keep a certain desired vacuum level, the vacuum pumps have to be run at different speeds at different times depending on the amount of air to be removed at the different times to provide this desired vacuum level.

The term "running vacuum pumps in parallel" refers to the case when two or more vacuum pumps receives the same control signal from the control unit 2 and their speed is regulated in accordance with this control signal. When a vacuum pump is added (ramped up) or removed (ramped down) the vacuum pump being ramped up or ramped down is not run in parallel with the one or more other vacuum pump(s). For example, when a second vacuum pump is needed, only the first vacuum pump is run based on the control signal from the regulator part of the control unit 2. When the second vacuum pump has ramped up, the first vacuum pump is ramped down and they are then both run based on the same control signal, i.e. run in parallel.

In summary, in accordance with the invention, there is no need to over-dimension the capacity of one variable speed pump in order to be able to provide a required vacuum level at maximum amount of air let into the milking system, nor is there a need to run two or more variable speed vacuum pumps at their lower capacity limit. In accordance with the invention the number of variable speed vacuum pumps that is in fact needed at a particular milking operation is utilized. To use two or more vacuum pumps running on, for example, half their maximum capacity is more energy consuming than having one vacuum pump running on its maximum capacity. The invention thus provides an energy efficient solution.

The invention claimed is:

1. A method for creating a required vacuum level within a milking system, said milking system comprising at least two variable speed vacuum pumps, said method comprising:
   utilizing a first variable speed vacuum pump, of a plural vacuum pump system within said milking system, for creating the required vacuum level within said milking system,
   monitoring the vacuum level requirement within the milking system, and when the vacuum level requirement of the milking system is such that the speed of said first variable speed vacuum pump reaches a first speed threshold, then starting a second variable speed vacuum pump, said first speed threshold being less than a maximum speed of said first variable speed vacuum pump, and
   running said first and second variable speed vacuum pumps in parallel for creating the required vacuum level,
   wherein said running of said first and second variable speed vacuum pumps in parallel comprises running said first and said second variable speed vacuum pumps based on a common control signal with the common control signal maintaining said first and second variable speed vacuum pumps at an equal speed, the equal speed being variable while running the pumps in parallel to create the required vacuum level.

2. The method as claimed in claim 1, wherein said starting the second variable speed vacuum pump comprises increasing the speed of said second variable speed vacuum pump and decreasing the speed of said first variable speed vacuum pump correspondingly until their respective speeds are equal, thereafter, while running in parallel, the first and second variable speed vacuum pumps are maintained at the equal speed.

3. The method as claimed in claim 1, wherein a vacuum sensor is used to monitor the vacuum level.

4. The method as claimed in claim 1, further comprising:
   starting a third variable speed vacuum pump when the speed of at least one of said first and said second variable speed vacuum pumps reaches a second speed threshold, and running said first, second, and third variable speed vacuum pumps in parallel for creating the required vacuum level,
wherein said running said first, second, and third variable speed vacuum pumps in parallel comprises running said first, second, and third variable speed vacuum pumps based on the common control signal and being maintained at the equal speed.

5. The method as claimed in claim 4, wherein said starting the third variable speed vacuum pump comprises increasing the speed of said third variable speed vacuum pump and decreasing the speed of said first and second variable speed vacuum pumps correspondingly until the speed of said third variable speed vacuum pump is equal to the speed of said first and second variable speed vacuum pumps, and running said first, second and third variable speed vacuum pumps in parallel for creating the required vacuum level, thereafter, while running in parallel, the first, second, and third variable speed vacuum pumps are maintained at the equal speed.

6. The method as claimed in claim 4, wherein said second speed threshold is equal to said first speed threshold.

7. The method as claimed in claim 4, wherein,
wherein the second speed threshold is 80% of a maximum speed of said first variable speed vacuum pump.

8. The method as claimed in 4, comprising the further step of:
decreasing the speed of one of said first, second, and third variable speed vacuum pumps to zero when the vacuum requirement within the milking system is such that the speed of said first variable speed vacuum pumps falls below a third speed threshold,
wherein, while decreasing the speed of said one of said first, second, and third variable speed vacuum pumps to zero, the speed of said other variable speed vacuum pumps increased to maintain the required vacuum level.

9. The method as claimed in claim 1, further comprising:
starting an $n^{th}$ variable speed vacuum pump when the speed of the first, the second, and up to an $n^{th-1}$ variable speed vacuum pumps reaches an $n^{th-1}$ speed threshold, increasing the speed of said $n^{th}$ variable speed vacuum pump and decreasing the speed of said first, second and up to said $n^{th-1}$ variable speed vacuum pumps correspondingly until the speed of said $n^{th}$ variable speed vacuum pump is equal to the speed of said first, second, and up to said $n^{th-1}$ variable speed vacuum pumps and running said first, second and up to said $n^{th}$ variable speed vacuum pumps in parallel, at the equal speed, for creating the required vacuum level.

10. The method as claimed in claim 1, further comprising:
decreasing the speed of said second variable speed vacuum pump to zero when the vacuum requirement within the milking system is such that the speed of said first variable speed vacuum pumps falls below a third speed threshold.

11. The method as claimed in claim 10, wherein, while decreasing the speed of said second variable speed vacuum pump to zero, the speed of said second variable speed vacuum pump is decreased in correspondence with increasing the speed of said first variable speed vacuum pump to maintain the required vacuum level.

12. The method as claimed in claim 1, wherein the order of priority of usage of said first and second variable speed vacuum pumps is shifted so that said second variable speed vacuum pump is used initially and said first variable speed vacuum pump is used when needed, as determined by the monitored required vacuum level.

13. The method as claimed in claim 1, wherein said variable speed vacuum pumps comprise displacement vacuum pumps.

14. The method as claimed in claim 1, wherein when increasing the speed of the variable speed vacuum pumps, the speed is increased 5-40 Hz per second.

15. The method as claimed in claim 1, wherein when decreasing the speed of the variable speed vacuum pumps, the speed is decreased 5-40 Hz per second.

16. The method as claimed in claim 1, wherein said variable speed vacuum pumps comprise lobe vacuum pumps.

17. The method as claimed in 1,
wherein the equal speed of the first and second variable speed vacuum pumps, when run together in parallel is 75-90% of a maximum speed of each of the first and second variable speed vacuum pumps,
the method comprising further steps of:
when the equal speed decreases below 75%, decreasing the speed of said first variable speed vacuum pump to zero and correspondingly increasing the speed of the second variable speed vacuum pump to maintain the required vacuum level; and
when the equal speed increases above 90%, starting a third variable speed vacuum, running said first, second, and third variable speed vacuum pumps in parallel for creating the required vacuum level, wherein said running said first, second, and third variable speed vacuum pumps in parallel comprises running said first, second, and third variable speed vacuum pumps based on the common control signal maintaining said first, second, and third variable speed vacuum pumps at the equal speed to maintain the required vacuum level.

18. The method as claimed in claim 17, wherein the third speed threshold is 20% of a maximum speed of said first variable speed vacuum pump.

* * * * *

UNITED STATES PATENT AND TRADEMARK OFFICE
CERTIFICATE OF CORRECTION

PATENT NO. : 8,381,679 B2  Page 1 of 1
APPLICATION NO. : 12/450069
DATED : February 26, 2013
INVENTOR(S) : Henrik Idensjo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 407 days.

Signed and Sealed this
First Day of September, 2015

Michelle K. Lee
*Director of the United States Patent and Trademark Office*